United States Patent Office 3,155,710
Patented Nov. 3, 1964

3,155,710
PROCESS FOR PREPARING PHOSPHATE ESTERS WITH A VANADIUM CATALYST
Carroll A. Hochwalt, Clayton, Mo., assignor to Monsanto Company, a corporation of Delaware
No Drawing. Filed Nov. 7, 1962, Ser. No. 236,126
19 Claims. (Cl. 260—461)

This invention relates to a novel process for the preparation of triorgano-phosphates. More particularly, this invention is concerned with a process comprising the catalyzed reaction of phosphorus oxyhalides and monohydric organic compounds.

Several methods have been long known to the art for preparing triorgano-phosphates of the type hereinafter described. One of these methods involves the reaction of a phosphorus oxyhalide and a monohydric organic compound without the use of a catalyst. Such a process is not commercially practical because of the need for lengthy reaction times to complete the reaction and the resultant low yields. Another disadvantage of previous processes of this type is the need for the use of excessive amounts of the monohydric organic compound.

Another known method comprises the addition of a tertiary amine to the reaction mixture to produce higher yields. The cost of the amines and the cost of recovering the amines for reuse in the process render this method economically impractical for commercial operation.

In still other methods, the reaction is catalyzed so as to produce greater yields by adding to the reaction mixture a metal such as copper powder, iron filings, calcium, aluminum, magnesium, and the like; or a halide such as aluminum chloride, magnesium chloride, ferric chloride, tin tetrachloride, zinc chloride, boron trifluoride, and the like; or a sulfate such as copper sulfate and the like; or an oxide such as magnesium oxide, copper oxide, and the like.

The employment of these catalysts has several attendant inherent disadvantages, among which are low conversion of the starting materials and lengthy reaction times required for completion of the reaction. As described in United States Patents 2,610,978 and 2,632,018, an insoluble complex forms during the reaction when aluminum chloride is used as a catalyst.

When alcohols are reacted with phosphorus oxychloride either without a catalyst or in the presence of any of the above-mentioned catalysts, other than magnesium chloride, undesirable by-products are formed. These by-products contribute difficult distillation problems, to lower yields of the desired product and to lower reaction efficiency. A known method described in United States Patent 2,410,118 is illustrative of the typical distillation problems encountered. In this method, distillation is difficult due to the concentration of the large amount of salts of various phosphoric acids in the distillation still.

United States Patent 2,868,827 describes the use of titanium tetrachloride as a catalyst for producing triorgano-phosphates. Disadvantages encountered employing titanium tetrachloride reside in the excessive and lengthy reaction times necessary to obtain desirable yields and the relatively large amounts of the metal halide catalysts required.

When the reaction is conducted in the presence of a titanium halide catalyst, another problem which exists is the recovery of the desired reaction product. At the completion of the reaction, it has been found necessary to wash the reaction mixture with a citrate or tartrate solution which forms a complex with the titanium catalyst. The complex is then removed by washing with water followed by drying the remaining product.

Another disadvantage encountered with the employment of many of the aforedescribed catalysts is the need for complicated material-handling procedures for the catalyst.

Accordingly, it is a primary object of this invention to provide a novel and improved catalytic process for the preparation of triorgano-phosphates in which the attendant disadvantages of the prior art are eliminated.

More specifically, it is an object of this invention to provide such a process wherein the catalyst is noncorrosive and is easily and safely handled. Additionally, it is an object of this invention to provide such a process wherein the catalyst removal has been greatly simplified. It is also an object of this invention to provide a novel process in which the time required for the completion of the reaction is relatively short. A still further object of this invention is to provide a process for the more facile and inexpensive production of the desired phosphorus triesters.

These and still other objects, features, and advantages will become apparent from the following detailed description. In accordance with the invention, a phosphorus oxyhalide is reacted with a monohydroxy organic compound in the presence of a vanadium compound. The reaction proceeds smoothly over a substantial temperature range while the catalyst displays no tendency to interfere.

Among the phosphorus compounds useful as starting materials in this process are phosphorus oxychloride, phosphorus oxybromide, and the substituted derivatives thereof. Such derivatives include those wherein one or two of the halogen atoms are replaced by a corresponding number of hydrocarbon radicals or halogenated hydrocarbon radicals, said radicals being either directly connected to the phosphorus atom or connected to said atom through an oxygen atom. Exemplary phosphorus compounds which may be employed comprise the phosphorus oxyhalides such as phosphorus oxychloride and phosphorus oxybromide; the mixed oxyhalides such as phosphorus oxydibromide chloride and phosphorus oxydichloride bromide; the alkylated halophosphates such as monoethyl dichlorophosphate, dipropyl bromophosphate, mono-(2-ethylhexyl)dichlorophosphate, and didecyl chlorophosphate; the alicyclic halophosphates such as cyclopentyl dichlorophosphate and dicyclohexyl chlorophosphate; the aryl halophosphates such as phenyl dichlorophosphate and diphenyl bromophosphate; the aralkyl halophosphates such as p-ethyl-phenyl dichlorophosphate and cresyl dichlorophosphate; the haloalkyl and haloaryl halophosphates such as 2-bromoethyl dibromophosphate, di(2-chloropropyl)chlorophosphate, p-chlorophenyl dichlorophosphate, di-(p-bromophenyl)bromophosphate, and p-chlorophenyl dibromophosphate; the diol halophosphates such as 1,3-butanediol monochlorophosphate, 1,3-hexanediol monochlorophosphate, and 1,4-butanediol bis-(dichlorophosphate); and other substituted phosphorus oxyhalides such as methoxyethyl dichlorophosphate, ethoxypropyl dichlorophosphate, and phenoxyethyl dichlorophosphate. It should also be noted that, where desired, the corresponding halophosphonates may be employed.

The monohydroxy organic compounds which can be used in the process of this invention are the monohydroxy aliphatic primary alcohols, examples of which are the alkanols, such as n-pentanol, isopentanol, n-hexanol, isohexanol, 2-ethylbutanol-1, 2,2,4-trimethylpentanol, n-heptanol, n-octanol, 2-ethylhexanol, isooctanol, nonanol, isononanol, n-decanol, isodecanol, n-dodecanol, 2-butyl-octanol-1, tridecanol, tetradecanol, pentadecanol, octadecanol, β-phenylethanol, cyclohexylmethanol, cyclohexylethanol, cyclohexylbutanol; the monohydric phenols such as phenol, o-cresol, m-cresol, p-cresol, mixed cresols, o-ethylphenol, m-ethylphenol, p-ethylphenol, 2-n-propylphenol, 3-n-propylphenol, 4-n-propylphenol, 2-isopropylphenol, 3-isopropylphenol, 4-isopropylphenol, 2-n-butylphenol, 3-n-butylphenol, 4-n-butylphenol, dl-sec.-butylphenol, 4-tert.-butylphenol, diisobutylphenol, 4-tert.-amylphenol, p,n-hexylphenol, p,n-heptylphenol, octylphenol, p-tert.-octylphenol, nonylphenol, dodecylphenol, 3-pentadecylphenol, 2,3-dimethylphenol, 3,4-dimethylphenol, 2,4-dimethylphenol, 3,5-dimethylphenol, 2,5-dimethylphenol, mixed dimethylphenols, 3-methyl-6-isopropylphenol, 3-methyl-5-isopropylphenol, 4-methyl-4-isopropylphenol, 2-methyl-4-isopropylphenol, 2-methyl-5-isopropylphenol, 5-methyl-2-isopropylphenol, 2-methyl-4-n-butylphenol, 3-methyl - 6 - n-butylphenol, 4-methyl-6-n-butylphenol, 3-methyl-6-tert.-butylphenol, 4-methyl-6-tert.-butylphenol, 2,4,5-trimethylphenol, 2,3,5-trimethylphenol, 3,4,5-trimethylphenol, 2,3,4-trimethylphenol, and the like.

Moreover, while specific straight and branched chain primary alcohols have been described for the purpose of illustration, all of the isomeric forms of these primary alcohols and mixtures thereof are suitable for use in the process of this invention. The highest yields have been found to be obtainable from the primary aliphatic alcohols which are substituted in the 2-position.

It is to be noted that the process of this invention is not limited in any manner by the particular source of said alcohols, whether such sources be natural or synthetic. Thus, for example, the alcohols can be produced by the Oxo synthesis, or can be produced by the hydration of olefins or the oxidation of petroleum fractions, or can be produced by the catalytic hydrogenation of coconut oil.

Representative of the vanadium compounds which may be employed herein are vanadium tribromide, vanadium dichloride, vanadium trichloride, vanadium tetrachloride, vanadium trifluoride, vanadium tetrafluoride, vanadium pentafluoride, vanadyl monobromide, vanadyl dibromide, vanadyl tribromide, vanadyl chloride, vanadyl dichloride, vanadyl trichloride, vanadyl difluoride, vanadyl trifluoride, ammonium metavanadate, calcium metavanadate, copper metavanadate, potassium metavanadate, silver metavanadate, sodium orthovanadate, barium pyrovanadate, lithium metavanadate, vanadium dioxide, vanadium trioxide, vanadium tetraoxide, and vanadium pentoxide. As employed in this application, the terms "vanadium compound" and "compound of vanadium" refer, not only to individual compounds themselves, but also to mixtures of two or more of such compounds.

The reaction of the process of this invention proceeds according to the following equation, which illustrates typical starting materials:

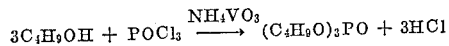

$$3C_4H_9OH + POCl_3 \xrightarrow{NH_4VO_3} (C_4H_9O)_3PO + 3HCl$$

The amount of alcohol employed may be in substantial excess of the quantity which would be required by theory to insure that all of the halogen substituents connected to the phosphorus will react. Such excess can comprise from about 5% up to as much as 50% of the theoretical amount. However, it should be pointed out that the reaction will proceed in the presence of the stoichiometric quantity of alcohol.

In general, a wide variety of vanadium compounds can be used to catalyze the reaction of this invention. It is preferred to employ a compound selected from the vanadium halides, the vanadyl halides, the vanadium oxides, and the vanadates. In connection with the vanadates, it should be noted that the ortho, meta and pyro forms may be used. The vanadium catalyst is found to be suitable over a fairly wide range of quantities. It has been determined that as little as 0.005% by weight of the catalyst, based upon the weight of the monohydroxy organic starting material, will serve to insure reaction. The upper percentage limit of catalyst will be primarily dependent upon practical and economic consideration, amounts up to at least 10% having been found suitable. For most reactions, it is preferred to employ a catalyst concentration of from about 0.5% to about 3% by weight based upon the weight of the starting monohydroxy organic compound. Both the technical grades and commercially pure grade of the catalytic material work equally well.

In practicing the process of this invention, the alcohol and vanadium catalysts are placed in a reactor, and the phosphorus oxyhalide is added. Those skilled in the art will recognize that the process is not limited to specific reaction temperatures, since the reaction can be carried out at temperatures of from 0° C. to temperatures of 150° C. The preferred temperature range varies from about 5° C. to 95° C. Upon completion of the reaction, the desired phosphorus product is recovered by the simple expedient of washing with water and sodium carbonate solutions to remove the catalyst, and drying the remaining product.

The invention will be more fully understood by reference to the following examples. Such examples, however, are given for the purpose of illustration only and are not to be construed as limiting the scope of the present invention in any way.

*Example I*

A suitable reactor is charged with 214.8 grams (1.65 mols) of 2-ethylhexanol and 8.0 grams of ammonium metavanadate. Seventy-six and seven-tenths grams (0.5 mol) of phosphorus oxychloride is added over a period of about one hour while the temperature is maintained at 10–14° C. The pressure is reduced to 30 mm. Hg, and the reaction mixture is heated to about 90° C. to insure completion of the reaction. The resultant reaction mixture is washed several times with water and finally with aqueous sodium carbonate. The reaction mixture is steam sparged under vacuum and dried. There is obtained 145.7 grams (66.7% of theory) of tri-2-ethylhexyl phosphate.

*Example II*

A suitable reactor is charged with 83.3 grams (0.64 mol) of 2-ethylhexanol followed by 1.6 grams of vanadium tetrachloride. There is then added 30.8 grams (0.20 mol) of phosphorus oxychloride over a period of about one hour. The mixture is maintained at 10–12° C. during the phosphorus oxychloride addition. The pressure is then reduced to 30 mm. Hg, and the reaction mixture is heated to about 85° C., which are maintained for five hours to insure completion of the reaction. The remaining reaction mixture is washed several times with water and finally with aqueous sodium carbonate. The washed product is steam sparged under vacuum and dried. There is obtained 53.9 grams of tri-2-ethylhexyl phosphate.

*Example III*

A suitable reactor is charged with 168.6 grams (1.65 mols) of 2-ethylbutanol followed by 1.7 grams of ammonium metavanadate. There is added 76.7 grams (0.5 mol) of phosphorus oxychloride over a period of about one-half hour. The mixture is maintained at 10–15° C. during the addition of the phosphorus oxychloride. The pressure is then reduced to 35 mm. Hg, and the reaction mixture is heated to about 90° C. to insure completion of the reaction. This temperature and pressure are maintained for five hours. The reaction mixture is then washed several times with water and finally with aqueous sodium carbonate to remove the catalyst. The remaining product is dried. There is obtained 130.4 grams (74.3% of theory) of tri-2-ethylbutyl phosphate.

Examples IV–IX

Following the procedure of Example I, 1.65 mols of each of the monohydroxy aliphatic primary alcohols tabulated below is substituted for the 2-ethylhexanol. The product obtained in each instance is indicated:

(IV)
Alcohol=butanol
Product=tributyl phosphate (V)
Alcohol=isohexanol
Product=triisohexyl phosphate (VI)
Alcohol=n-octanol
Product=trioctyl phosphate (VII)
Alcohol=2,2,4-trimethylpentanol
Product=tri-(2,2,4-trimethylpentyl)phosphate (VIII)
Alcohol=tridecanol
Product=tridecyl phosphate (IX)
Alcohol=2-butyloctanol
Product=tri-(2-butyloctyl)phosphate

Example X

A suitable reactor is charged with 416.6 grams (3.2 mols) of 2-ethylhexanol followed by 8.3 grams of vanadium tetrachloride. There is then added 153.4 grams (1.0 mol) of phosphorus oxychloride over a period of about two hours. The mixture is maintained at 30–35° C. during the addition of the phosphorus oxychloride. The pressure is then reduced to 55 mm. Hg, and the reaction mixture is heated to about 70° C., which are maintained for a period of five hours to insure completion of the reaction. The reaction mixture is then washed several times with water and finally with aqueous sodium carbonate, and the remaining product is dried. There is obtained 303.3 grams (70% of theory) of tri-2-ethylhexyl phosphate.

Example XI

A suitable reactor is charged with 214.8 grams (1.65 mols) of isooctanol and 4.6 grams of ammonium metavanadate. Seventy-six and seven-tenths grams (0.5 mol) of phosphorus oxychloride is added over a period of about one-half hour while the temperature is maintained at 5–10° C. The reaction mixture is worked up as heretofore described. A good yield of triisooctyl phosphate is obtained.

Example XII

A suitable reactor is charged with 173.6 grams (1.55 mols) of cresylic acid followed by 5.2 grams of ammonium metavanadate. There is then added 76.7 grams (0.5 mol) of phosphorus oxychloride over a period of about one-half hour. The mixture is maintained at 60° C. during the addition of the phosphorus oxychloride. Upon completion of the addition of the phosphorus oxychloride, the temperature of the reaction mixture is slowly raised to 135° C. to insure completion of the reaction. The reaction mixture is then washed several times with water and finally with dilute sodium hydroxide solutions. The reaction mixture is steam sparged and dried. There is obtained 108.2 grams of tricresyl phosphate.

Example XIII

Following the procedure set forth in Example II, 1.6 grams of vanadium trichloride is employed as the catalyst. There is obtained tri-(2-ethylhexyl)phosphate in good yield.

Example XIV

A charge of 122.9 grams (0.5 mol) of isooctyl phosphoro-dichloridate is added over a period of 1½ hours to a reactor charged with 143.2 grams (1.1 mols) of 2-ethylhexanol and 1.4 grams of ammonium metavanadate. The temperature of the reaction mixture is maintained at 10–15° C. during the addition of the isooctyl phosphorodichloridate. The pressure is reduced to 70 mm. Hg, and the reaction mixture is heated to about 95° C. for about one hour to insure completion of the reaction. The resultant reaction mixture is then washed several times with water and finally with aqueous sodium carbonate. The reaction mixture is steam sparged under vacuum and dried. There is obtained isooctyl-di-2-ethylhexyl phosphate in good yield.

Example XV

Following the procedure of Example I, 107.5 grams (0.825 mol) of 2-ethylhexanol, 1.7 grams of ammonium metavanadate, and 71.7 grams (0.25 mol) of phosphorus oxybromide are used to prepare tri-2-ethylhexyl phosphate in good yield.

Example XVI

A suitable reactor is charged with 168.6 grams (1.65 mols) of 2-ethylbutanol and 1.7 grams of vanadium tetroxide. Seventy-six and seven-tenths grams (0.5 mol) of phosphorus oxychloride is added over a period of about one-half hour. The mixture is maintained at 20–25° C. during the addition of the phosphorus oxychloride. The pressure is then reduced to 35–40 mm. Hg, and the reaction mixture is heated to about 85° C. to insure the completion of the reaction. The resultant reaction mixture is washed several times with water and finally with aqueous sodium carbonate. The reaction mixture is steam sparged under vacuum and dried. There is obtained 72 grams of tri-(2-ethylbutyl)phosphate.

Example XVII

Following the procedure of Example I, 214.8 grams (1.65 mols) of 2-ethylhexanol, 2.2 grams of vanadyl dichloride, and 76.7 grams (0.5 mol) of phosphorus oxychloride are utilized to prepare tri-(2-ethylhexyl)phosphate in good yield.

It is to be understood that, as employed in the preceding description and the ensuing claims, the term "halogen" and the derivatives thereof include chlorine, bromine, fluorine, and iodine.

While this invention has been described with respect to certain embodiments, it is not so limited, and it is to be understood that variations and modifications thereof may be made which are obvious to those skilled in the art without departing from the spirit or scope of this invention.

The embodiments of the invention in which an exclusive property or privilege is claimed are defined as follows:

1. In a process for preparing a triorgano-phosphate which comprises reacting a monohydric compound selected from the group consisting of monohydric aliphatic saturated primary alcohols having 5 to 18 carbon atoms; phenol and substituted phenols having 1 to 3 alkyl substituents, said alkyl substituents containing 1 to 18 carbon atoms and said substituted phenols having at least one unsubstituted ortho position; with a phosphorus compound of the general formula

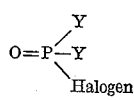

wherein each Y is selected from the group consisting of halogen, alkoxy, haloalkoxy, aryloxy, haloaryloxy, alkoxyalkoxy and aryloxyalkoxy, the improvement which comprises carrying out the reaction in the presence of a compound selected from the class consisting of vanadium halides, vanadium oxides, vanadyl halides, and vanadates, said vanadates being selected from the group consisting of alkali metal vanadates, alkaline earth metal vanadates, ammonium metavanadate, copper metavanadate and silver metavanadate.

2. A process of claim 1 wherein the reaction temperature is from about 0 to 150° C.

3. A process of claim 1 wherein the reaction temperature is from about 5 to 95° C.

4. A process of claim 1 wherein the concentration of vanadium compound is from about 0.005% to 10% by weight based upon the weight of the monohydroxy organic compound.

5. A process of claim 1 wherein the concentration of vanadium compound is from about 0.5% to 3% by weight based upon the weight of monohydroxy organic compound.

6. A process of claim 1 wherein the vanadium compound is a vanadate.

7. In a process for preparing a triorgano-phosphate which comprises reacting a monohydric aliphatic saturated primary alcohols having 5 to 18 carbon atoms; with a phosphorus compound of the general formula

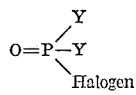

wherein each Y is selected from the group consisting of halogen, alkoxy, haloalkoxy, aryloxy, haloaryloxy, alkoxyalkoxy and aryloxyalkoxy, the improvement which comprises carrying out the reaction in the presence of a compound selected from the class consisting of vanadium halides, vanadium oxides, vanadyl halides, and vanadates, said vanadates being selected from the group consisting of alkali metal vanadates, alkaline earth metal vanadates, ammonium metavanadate, copper metavanadate and silver metavanadate.

8. A process of claim 7 wherein the reaction temperature is from about 0 to 150° C., and the vanadium compound concentration is from about 0.005% to about 10% of the weight based upon the weight of the monohydric aliphatic primary alcohol.

9. A process of claim 7 wherein the reaction temperature is from about 5 to 95° C., and the vanadium compound concentration is from about 0.5% to about 3.0% by weight based upon the weight of the monohydric aliphatic primary alcohol.

10. A process of claim 7 wherein the monohydric aliphatic alcohol is a 2-substituted monohydric aliphatic primary alcohol.

11. In a process for preparing a triorgano-phosphate which comprises reacting a monohydric compound selected from the group consisting of phenol and substituted phenols having 1 to 3 alkyl substituents, said alkyl substituents containing 1 to 18 carbon atoms and said substituted phenols having at least one unsubstituted ortho position; with a phosphorus compound of the general formula

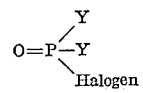

wherein each Y is selected from the group consisting of halogen, alkoxy, haloalkoxy, aryloxy, haloaryloxy, alkoxyalkoxy and aryloxyalkoxy, the improvement which comprises carrying out the reaction in the presence of a compound selected from the class consisting of vanadium halides, vanadium oxides, vanadyl halides, and vanadates, said vanadates being selected from the group consisting of alkali metal vanadates, alkaline earth metal vanadates, ammonium metavanadate, copper metavanadate and silver metavanadate.

12. A process of claim 11 wherein the reaction temperature is from about 0 to 150° C., and the vanadium compound concentration is from about 0.005% to about 10% by weight based upon the weight of the monohydric phenol.

13. A process of claim 11 wherein the reaction temperature is from about 5 to 95° C., and the vanadium compound concentration is from about 0.5% to about 3.0% by weight based upon the weight of the monohydric phenol.

14. In a process for preparing tri-2-ethylhexyl phosphate which comprises reacting 2-ethylhexanol with phosphorus oxychloride, the improvement which comprises carrying out the reaction in the presence of a vanadium compound selected from the group consisting of vanadium halides, vanadium oxides, vanadyl halides, and vanadates, said vanadates being selected from the group consisting of alkali metal vanadates, alkaline earth metal vanadates, ammonium metavanadate, copper vanadate and silver vanadate.

15. A process of claim 14 wherein the vanadium compound is ammonium metavanadate.

16. A process of claim 14 wherein the vanadium compound is vanadium trichloride.

17. A process of claim 14 wherein the vanadium compound is vanadium tetrachloride.

18. A process of claim 14 wherein the vanadium compound is vanadyl dichloride.

19. A process of claim 14 wherein the vanadium compound is vanadium tetraoxide.

References Cited in the file of this patent
UNITED STATES PATENTS 2,868,827   O'Connor et al. _____ Jan. 13, 1959
3,010,988   Raffelson et al. _____ Nov. 28, 1961

OTHER REFERENCES

Zal'Kind et al.: "Chem. Abst.," vol. 30, col. 3836 (1936).